United States Patent
Tran et al.

(10) Patent No.: US 10,521,310 B2
(45) Date of Patent: Dec. 31, 2019

(54) PRIORITIZED DEPLOYMENT OF DATABASE ARTIFACTS

(71) Applicant: SAP SE, Walldorf (DE)

(72) Inventors: Le-Huan Stefan Tran, Wiesloch (DE); Arne Harren, Walldorf (DE); Jonathan Bregler, Kraichtal (DE); Alexander Bunte, Heidelberg (DE); Andreas Kellner, Birkenau (DE); Daniel Kuntze, Bruchsal (DE); Vladislav Leonkev, Walldorf (DE); Simon Lueders, Walldorf (DE); Volker Sauermann, Dossenheim (DE); Michael Schnaubelt, Leimen (DE)

(73) Assignee: SAP SE, Walldorf (DE)

( * ) Notice: Subject to any disclaimer, the term of this patent is extended or adjusted under 35 U.S.C. 154(b) by 515 days.

(21) Appl. No.: 15/221,998

(22) Filed: Jul. 28, 2016

(65) Prior Publication Data
US 2017/0322966 A1    Nov. 9, 2017

Related U.S. Application Data

(60) Provisional application No. 62/333,416, filed on May 9, 2016.

(51) Int. Cl.
*G06F 16/26* (2019.01)
*G06F 11/14* (2006.01)
(Continued)

(52) U.S. Cl.
CPC ...... *G06F 11/1458* (2013.01); *G06F 11/1471* (2013.01); *G06F 11/3664* (2013.01); *G06F 16/21* (2019.01); *G06F 2201/80* (2013.01)

(58) Field of Classification Search
CPC ......... G06F 17/30345; G06F 17/30958; G06F 16/9024; G06F 16/2246; G06F 16/26
See application file for complete search history.

(56) References Cited

U.S. PATENT DOCUMENTS

2005/0192979 A1* 9/2005 Keller ..................... G06F 8/61
2008/0189679 A1   8/2008 Rodriguez et al.
(Continued)

OTHER PUBLICATIONS

Non-Final Office Action for U.S. Appl. No. 15/222,012, dated Feb. 15, 2018, 10 pages.

(Continued)

*Primary Examiner* — Jeff A Burke
*Assistant Examiner* — Cindy Nguyen
(74) *Attorney, Agent, or Firm* — Fish & Richardson P.C.

(57) ABSTRACT

Systems and techniques for ordering deployment of artifacts to a database include collecting predecessor node information for nodes in a dependency graph. The dependency graph includes available edges connecting the nodes of the dependency graph, where each node in the dependency graph represents at least one artifact. A data structure contained within each of the nodes is populated with the predecessor node information. Successor node information is determined using the predecessor node information and an updated dependency graph is created by adding additional edges to the dependency graph using the predecessor node information in the data structure within each of the nodes and the successor node information. The artifacts are ordered for deployment to the database using the updated dependency graph.

18 Claims, 9 Drawing Sheets

(51) Int. Cl.
*G06F 16/21* (2019.01)
*G06F 11/36* (2006.01)

(56) References Cited

U.S. PATENT DOCUMENTS

| | | |
|---|---|---|
| 2009/0164201 A1 | 6/2009 | Celli et al. |
| 2009/0327324 A1 | 12/2009 | Laflen et al. |
| 2011/0270838 A1* | 11/2011 | Jameson ............ G06F 8/71 707/737 |
| 2014/0201218 A1* | 7/2014 | Catalano ............ G06Q 10/0631 707/748 |
| 2014/0282356 A1* | 9/2014 | Mills ............ G06F 17/30958 717/101 |
| 2016/0055222 A1 | 2/2016 | Sarferaz |
| 2016/0253625 A1* | 9/2016 | Casey ............ G06Q 10/103 717/101 |

OTHER PUBLICATIONS

U.S. Appl. No. 14/949,256, filed Nov. 23, 2015.
U.S. Appl. No. 14/948,990, filed Nov. 23, 2015.
U.S. Appl. No. 14/949,189, filed Nov. 23, 2015.
U.S. Appl. No. 14/949,128, filed Nov. 23, 2015.

* cited by examiner

PRIORITIZED DEPLOYMENT OF DATABASE ARTIFACTS

RELATED APPLICATION

This application is a non-provisional of, and claims priority to, U.S. Provisional Application No. 62/333,416, filed May 9, 2016, entitled "PRIORITIZED DATABASE ARTIFACT DEPLOYMENT", the disclosure of which is incorporated herein in its entirety.

BACKGROUND

Large database systems, such as enterprise resource planning ("ERP") systems, and customer relationship management ("CRM") can include database objects that store and organize data, as well as database objects for accessing the data. For example, in some database systems a database object may include a table, an index, and a view, as well as a procedure for accessing one or more tables, importing data into one or more tables, or a calculation view that manipulates the data in one or more tables. One example of such a database is the High-Performance Analytic Appliance ("HANA"), which is a column-oriented, in-memory database appliance available from SAP SE, Walldorf, Germany. HANA supports both column-based and row-based storage. Pushing down data-intensive computations into the database layer minimizes data transfers between the database layer and an application layer and takes advantage of in-memory capabilities, which are becoming more common. Because the database objects of such a system include procedures and other objects for manipulating the data, an application developer may develop some of the database objects themselves. Such a process may include developing design-time artifacts that are deployed to the database as run-time objects. For example, the developer, and/or a database administrator, may at design time develop or revise one or more database artifacts that are then deployed to the database as a run-time database object. The deployment of a database artifact may result in one or more database objects and the deployment of multiple database artifacts can result in one database object. Thus, the relationship between development database artifacts and run-time database objects may be one-to-one, one-to-many, many-to-one, or many-to-many.

Each developer and database administrator may deploy one or more database artifacts in a container, which is a separate database schema and acts as a sandbox to insulate database objects from deployment and run-time errors of other containers. A container may be generated and maintained for specific application tasks and may, thus, represent actions and data elements related to a real-world or conceptual object, such as a sales order, an invoice, a schedule, etc. For example, a container may be generated for sales orders and may include instructions for performing specific tasks on the data related to sales orders, as well as instructions defining the data itself. Containers can be user-specific or group-specific. Containers may access other containers via a private synonym, if the other container enables such access. Containers may be complex, with hundreds or even thousands of database artifacts, making manual deployment of the artifacts difficult and time consuming.

SUMMARY

Systems, methods and computer program products are disclosed for prioritized deployment of database artifacts. Automatic deployment may be accomplished via a Deployment Infrastructure. The deployment infrastructure may be a service layer of the database that simplifies the deployment of database artifacts. In some implementations, the database may be a HANA database and the deployment infrastructure may be referred to as HANA DI. The deployment infrastructure can provide a declarative approach for defining database objects (as design-time artifacts, also referred to as database artifacts) and ensure a consistent deployment into the database, based on a transactional all-or-nothing deployment model and implicit or automatic dependency management. The deployment infrastructure can use prioritized processing to deploy artifacts in a manner that ensures a correct deployment order of the artifacts.

DETAILED DESCRIPTION

Figure 1:
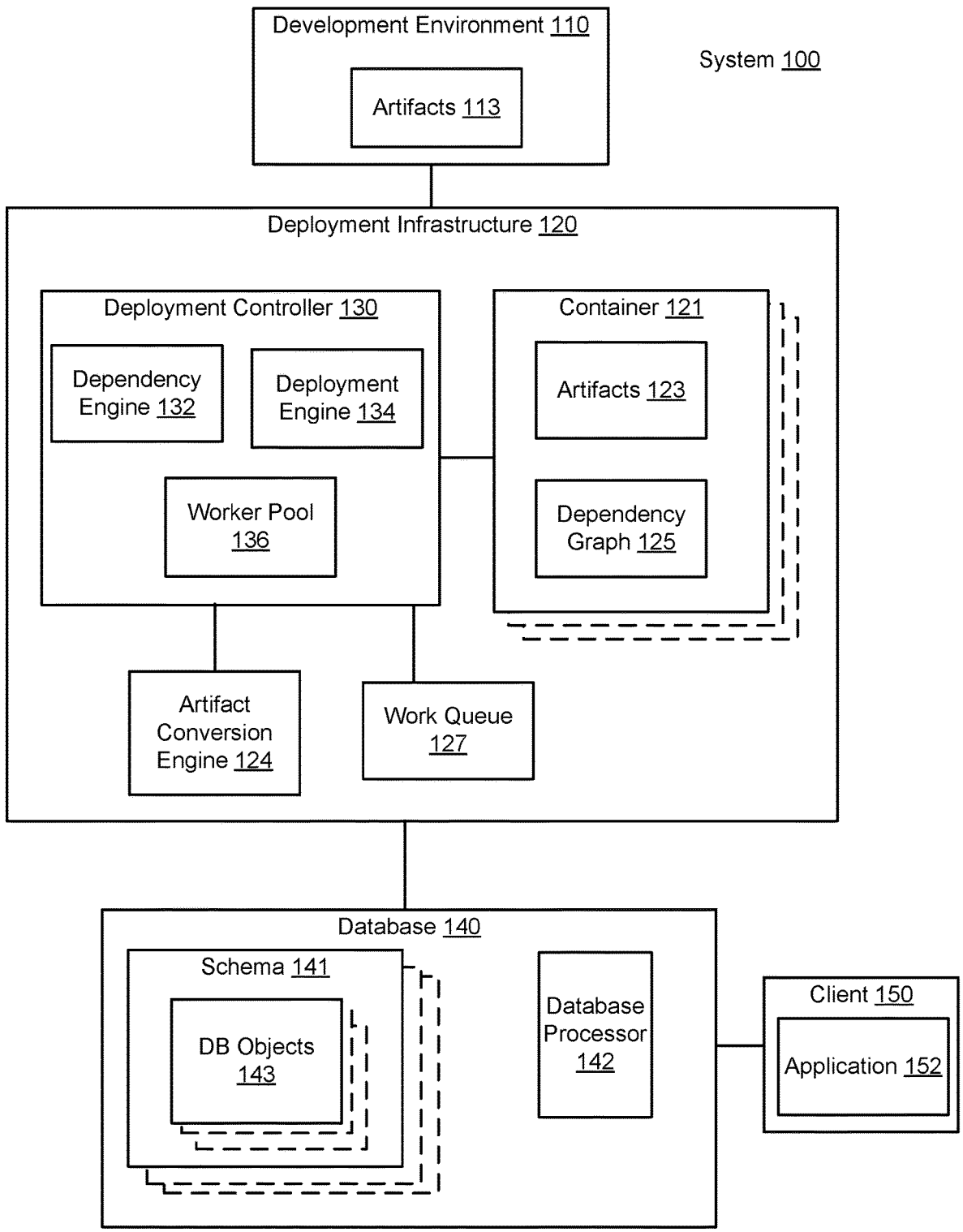
FIG. 1 is a block diagram of a system for prioritized deployment of database artifacts, consistent with disclosed implementations.

A deployment infrastructure system focuses on deployment aspects and addresses both development and modeling scenarios for a database. Implementations may handle development and modeling of database artifacts for deployment into the database as runtime database objects. Artifacts can include things like tables, views, indexes, core data services ("CDS"), calculation views, procedures and so forth. In some implementations, the deployment infrastructure system does not support non-database artifacts like JavaScript programs, OData artifacts, etc. Such artifacts can be handled by an application layer. An example of an application layer is extended services ("XSA") for a HANA database.

In some implementations, deployment of database objects via the deployment infrastructure is based on a container model, where each container corresponds to a database schema. Containers can be used for multiple deployments of the same database artifacts, and for development sandboxes. Containers may be isolated against each other by database means, e.g. each database schema with its deployed database objects is owned by a per-schema technical user. The technical user may be separate from a container owner to allow the separation of privileges for deployment and runtime access to deployed database objects. Thus, security aspects for deployment need only to consider technical users. A technical user can be for a specific container and may represent a user used by the deployment infrastructure 120 of FIG. 1, as discussed below, to communicate with database 140 of FIG. 1 and to deploy the artifacts as database objects into the database. A technical user is not a developer. Technical users decouple ownership from developers, i.e., the created database objects are owned by a technical user. Technical users may be used internally by the deployment infrastructure 120 and the database 140 of FIG. 1, as described below, and may be created as restricted database users, who do not have any default privileges. Thus, by default, cross-container access at the database level may not be possible; but can be granted via database privileges. In addition to the schema-based containers, the deployment infrastructure system may also use database schemata to isolate its metadata, for example, separating a definition of artifacts from the deployed database objects.

In some implementations, some database objects are written in a schema-free way, or in other words, without explicit schema references. This allows deployment of the same database objects into different containers because database objects reference other database objects only via object names without schema reference. The containers may be created by users who have the privilege to call a specific HANA DI SQL API function for creating a HANA DI container. Such a privilege can be granted by a database administrator. Database objects deployed using the HANA DI are deployed in a container. The database objects can be deployed by any user who has the privilege to call a specific HANA DI SQL API function of the desired container for deploying design-time artifacts. In such implementations, references to schema-external objects may be created via synonyms (or table links in case of Zero-Downtime Maintenance ("ZDM")) that are bound during deployment. The synonyms (or table links) provide schema-local names for the schema-external objects. Privileges on these schema-external objects can be explicitly granted to the container's technical user, e.g. SELECT-WITH-GRANT-OPTION privileges on schema-external ERP tables.

Deployment Infrastructure System

FIG. 1 illustrates a block diagram of an example deployment infrastructure system 100, according to disclosed implementations. The system 100 may be used to deploy design-time artifacts to create run-time objects that can be accessed by applications. The system 100 may include a database 140, a deployment infrastructure 120, and a development environment client 110. The development environment client 110 may include functionality from one or more development tools, such as a deployment infrastructure client, an extended services development infrastructure component, and an extended services deployment component. The development environment client 110 may be communicatively coupled with the deployment infrastructure 120. In some implementations, the development environment client 110 may access the deployment infrastructure 120 via a proxy (not shown) that insulates the deployment infrastructure 120 from direct access by the development environment client 110. In some implementations, the deployment infrastructure 120, the proxy, and the database 140 may be part of a database cluster. Deployment-related activities, such as staging of files, triggering of real deployment into a single container, etc., can be performed by a dedicated technical deployment user. As indicated above, the technical deployment user of the container can be different from the technical runtime user of the schema to allow separation of privileges for deployment and/or runtime access to the deployed database objects.

The development environment client 110 may enable the generation and maintenance (revision) of design-time artifacts 113 (also referred interchangeable as artifacts 113). The design-time artifacts 113 specify a definition of one or more database objects in a declarative way. In other words, the design-time artifacts 113 represent the target state of the database objects rather than using the imperative CREATE, ALTER, and DROP statements, which are conventionally used to generate database objects. The use of declarative statements for artifacts 113 not only enables the creation of run-time database objects, but also facilitates modeling a networked set of artifacts, such as tables, sequences, views, procedures, functions, data flows, etc. as design-time artifacts. In some implementations, not all artifacts have a one-to-one relationship to a SQL statement. For example, calculation views may result in multiple database objects and table data (e.g., a table import artifact) might be provided via CSV text files or even binary files which do not correspond to SQL. Thus, a single artifact may result in deployment of one or multiple database objects, and multiple artifacts can result in deployment of a single database object. The database objects deployed from an artifact may be controlled by the artifact conversion engine 124. The design-time artifacts 113 simplify a dependency-based deployment, re-deployment, and un-deployment, and facilitate lifecycle management aspects. For example, using design-time artifacts enables separation of the steps of 1) uploading the artifacts into deployment infrastructure (staging), and 2) deploying the artifacts to the database. Artifacts 113 also simplify incremental deployment because only modified design-time artifacts are uploaded and deployed rather than every artifact in the container.

When a developer or user of the deployment infrastructure is ready to deploy the design-time artifacts 113 from the development environment 110 to the deployment infrastructure 120, the developer or user of the deployment infrastructure may create a container 121 for the artifacts to reside in. A container 121 represents a database schema 141 in the database 140 and is a work space that can be owned and accessed by a single user or a group of users (e.g., a single developer or a group of developers). The container 121 includes container metadata, such as companion containers (i.e., companion schemata), technical users authorized to access the schema, etc. Companion containers are other containers that have database artifacts the container wants to access. A synonym in the container 121 enables the container 121 to access artifacts in the other container, i.e., the companion container. Metadata for a container 121 may, thus, identify run-time user privileges (e.g., for technical users of other containers), a container owner, or dependencies between design-time artifacts.

In some implementations, database objects are deployed in schema 141, which corresponds to a container. Thus, each container 121 has a corresponding schema 141. Each container 121 also may include other components such as a metadata schema, which may contain items such as a version number. In some implementations, a single deployment only operates on a single container 121 and the container boundary is a deployment boundary. In other words, affected database objects 143 inside other database schemata 141 (e.g., schemata that do not correspond with the container being deployed) are not re-deployed and deployment does not fail if database objects inside other schemata break. The container-based deployment of the deployment infrastructure system 100 enables the system to use transactional deployment. In other words, the deployment infrastructure system 100 may perform deployment modification of database objects 143, including DDL and DML operations and all re-deployments of affected objects, inside a single database transaction. In some implementations, sub-transactions do not exist. In other implementations, sub-transactions may be used for further optimization, e.g., to commit some parts of the deployment. Thus, the system 100 does not need compensation actions in case of rollbacks because these are handled by the database as part of the transaction management. As indicated above, some database objects 143 may be deployed outside of a schema 141, e.g., ERP objects that are created beforehand outside the container schema, e.g., they have been manually created in another schema or deployed in another container.

The user creating the container 121 may upload the artifacts 113 from the development environment 110 to the deployment infrastructure 120, which adds artifacts 123 to the container 121. Once the database artifacts 123 are loaded into the container 121, a user may begin the deployment of these artifacts 123 within that container 121. In some implementations, the deployment may be initiated via a make or deployment process. The deployment process may be directed by a deployment controller 130 of the deployment infrastructure 120. The deployment controller 130 may be instructions stored in one or more memories that, when executed by one or more processors formed in a substrate, cause the deployment infrastructure to perform certain operations. The deployment controller 130 may include one or more engines, which also may be referred to as "build plug-ins", that take the artifacts 123 in the container 121, determine dependencies for the artifacts 123, determine an order of deployment for the artifacts 123, and initiate generation of appropriate schema 141 and database objects 143 in accordance with existing authorization and syntactical requirements. In other words, the deployment controller 130 accomplishes deployment of the artifacts 123 in the container 121 in an automatic and transactional manner, providing error messages as appropriate, and eliminating the need for any user to manually determine the proper order of deployment for the artifacts 123.

Figure 3:
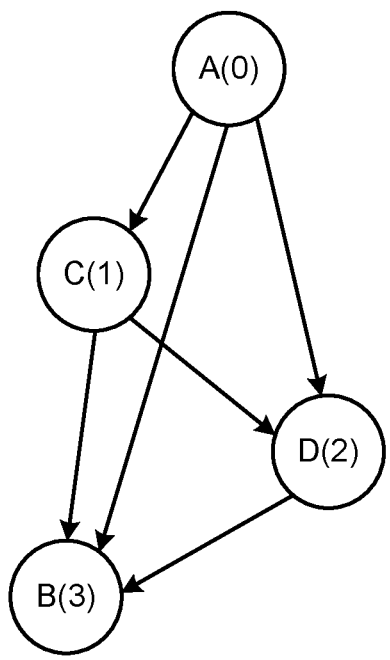
FIG. 3 is an example dependency graph, consistent with disclosed implementations.

In some implementations, the deployment controller 130 may include a dependency engine 132. The dependency engine 132 may oversee generation of a dependency graph 125 for the artifacts 123 in the container 121. The dependency graph 125 represents a proper order of deployment for the artifacts 123. In the dependency graph 125, a root node may be an artifact that is itself not dependent on any other artifact. It is possible for the dependency graph 125 to have multiple root nodes. FIG. 3 illustrates an example dependency graph. In FIG. 3, artifact A is a root node because artifact A is not dependent on any other artifact (e.g., has no incoming edges). Although FIG. 3 is depicted with incoming edges representing a dependency, some implementations may use outgoing edges rather than incoming edges to represent a dependency in the dependency graph 125. The dependency engine 132 may generate the dependency graph 125 by generating a node for each artifact 123 in the container 121 and extracting dependency information from the declarative statements in the artifacts 123 themselves. In some implementations, the dependency engine 132 may update the dependency graph 125 by adding additional dependency edges, also referred to as push-forward edges. In some implementations, such additional push-forward edges may be added by an artifact conversion engine 124. In some implementations, the dependency engine 132 may build the dependency graph 125 via an expand phase, a precompile phase, a merge phase, and a build phase. In the expand phase, the system may expand complex objects into separate artifacts. In the precompile stage, the system may determine dependencies in each artifact. In the merge phase, the system may merge separate artifacts into one object (e.g., merging an optional synonym configuration artifact and a synonym artifact into a synonym artifact with an explicit configuration), and in the build phase, the system may build the dependency graph with the backward edge count and push-forward edges. Deployment of the artifacts may take place during a walk-graph stage. In some implementations, each stage can utilize parallel processing.

The deployment controller 130 also may include a deployment engine 134. The deployment engine 134 may direct the deployment of artifacts 123 to database objects 143 using the dependency graph 125. The deployment controller 130 may use the dependency graph 125 to calculate the order in which the database objects need to be created, and to detect missing and/or required objects, as well as to find and report attempted unauthorized access of artifacts outside the container (e.g., via synonyms). In addition, the deployment engine 134 may use dependencies to re-deploy database objects that are affected by newly deployed or modified objects.

The deployment controller 130 (e.g., the dependency engine 132 and deployment engine 134) may work with an artifact conversion engine 124 in deployment of artifacts 123. In some implementations, the interpretation of artifacts including the extraction of dependencies and the steps taken to implement a target-state-based deployment of the artifacts is done by the artifact conversion engine 124, which includes deployment directives for each artifact type. In other words, the artifact conversion engine 124 may be formed from instructions, e.g., a build plugin, for a table artifact type, a plugin for a view artifact type, a plugin for a table import artifact type, etc. The plug-ins may be different files, different procedures, or just different portions of the artifact conversion engine 124. Each build plug-in may be a program or piece of code that execute the various build phases (precompile, merge, and expand) and transform a design-time artifact into a run-time database object. In some implementations, an application developer may provide the plug-in for an artifact type. In some implementations, the artifact conversion engine 124 may have access to a deployment container 121 via a SQL-based API only. Commands that the artifact conversion engine 124 needs for creating/altering/dropping a database object may be available at the SQL layer of the database 140. These SQL commands may take the database security constraints into account. In transactional deployment, the DDL and DML, statements may run inside a single database transaction in non-auto-commit mode. In some implementations, the database 140 may be insulated from the artifact conversion engine 124. For example, the artifact conversion engine 124 may issue commands via the deployment controller 130 to the database 140 rather than directly to the database 140. Such implementations insulate the database 140 from the artifact conversion engine 124 by having the deployment controller 130 (or another controller, such as database processor 142) check commands for authentication or syntax errors prior to executing the commands.

In some implementations, the deployment controller 130 may improve the functioning of the system 100 by using parallel processing to deploy the artifacts 123. In other words, the deployment controller 130 may improve the processing of the system 100 by speeding up the deployment of the artifacts 123. When the container 121 includes hundreds or thousands or artifacts 123, parallel processing may result in a substantial reduction in the deployment time. When the deployment controller 130 includes parallel processing, the deployment controller 130 may start one or more worker threads in a worker pool 136. The worker pool 136 represents the worker threads available for deploying the container 121. In other words, the worker threads in the worker pool 136 are available for deploying the artifacts 123 of the container 121. The deployment engine 134 may place artifacts 123 ready for immediate deployment (meaning any artifacts 123 not waiting on a dependency to be deployed) on the work queue 127. The worker threads in worker pool 136 may pull an artifact from the work queue 127 and deploy that artifact, e.g., initiating generation of one or more database objects 143. When all artifacts 123 have been deployed (or the transaction has failed and rolled back), the deployment controller 130 may close the work threads.

The system also may include database 140. The database 140 may support a variety of conventional database object types, such as tables, views, indexes, etc., as well as non-conventional database object types, such as procedures, calculation views, synonyms, etc. In some implementations, the database 140 is an in-memory column-oriented database, such as HANA, where HANA supports both column-based and row-based storage. The database 140 may include various database processors 142, which can include a database processor that communicates with an optional deployment infrastructure proxy component, a structured query language ("SQL") processor, etc. In some implementations, the development environment client 110 may use the proxy component to access the deployment infrastructure 120.

In some implementations, the deployment controller 130 can communicate with the database processor 142 via an internal application programming interface (e.g., HANA's internal EAPI Thin Layer SQL client) on a new database transaction. This new transaction may not be related to the database transaction in which the deployment infrastructure command is sent to the database 140. The SQL communication from deployment infrastructure 120 towards the database process 140 can be a trusted communication, which can allow deployment infrastructure to execute SQL statements on behalf of different technical users inside a single database transaction in order to implement different security features at the database layer.

In some implementations, the system 100 can provide an SQL-based API for the deployment infrastructure 120 that can be accessed via a standard SQL connection, where the API can be exposed at the SQL layer. In some implementations, the system 100 may include a higher-level privileged container management API that allows the creation and deletion of schema-based containers and a container-level deployment API that allows applications and/or lifecycle management tools to deploy/un-deploy artifacts within a container. In some implementations, the system may keep the deployment controller 130 and the artifact conversion engine 124 isolated in its own operation system process.

In some implementations, the database 140 may include a proxy engine (not shown). The proxy engine may handle communications between the deployment controller 130 and the database processor 142. For the purposes of decoupling, the deployment infrastructure 120 can provide database procedures for its APIs. Communication from the database 140 towards the deployment infrastructure 120 can be provided via a proxy library that can be loaded into the database 140. This proxy can implement database procedures and/or client-side of a deployment infrastructure network protocol. All incoming requests can be routed to the deployment infrastructure process using this network protocol.

In some implementations, the deployment infrastructure can be constrained by at least one of the following deployment architectural boundaries: database services, application programming interfaces, and technical users. For example, some database services may not allow access to database objects 143 by other schema. As another example, some technical users may not be granted access while others may be granted access to a schema 141. The database processor 142 may check these deploy-time conditions and issue an error if an attempt is made to violate a deployment boundary. In some implementations, the deployment infrastructure 120 may create the required metadata, database users, and/or database roles inside the database 140 to support the database service instance.

Although illustrated in FIG. 1 as separate from the database 140, in some implementations, the deployment infrastructure 120 can also be included in the database 140 or included in a database cluster that also includes the database 140.

Prioritized Deployment

FIG. 3 illustrates an example database artifact dependency graph. In the graph illustrated in FIG. 3 there are four artifacts, and artifacts B, C, and D all depend on artifact A. This means that before deployment of artifacts B, C, and D, the deployment infrastructure has to deploy artifact A; otherwise errors will occur because sooner or later some required artifact will not yet be deployed. In the same way, artifact D also depends on artifact C, so artifact C must be deployed before D, etc.

Figure 4:
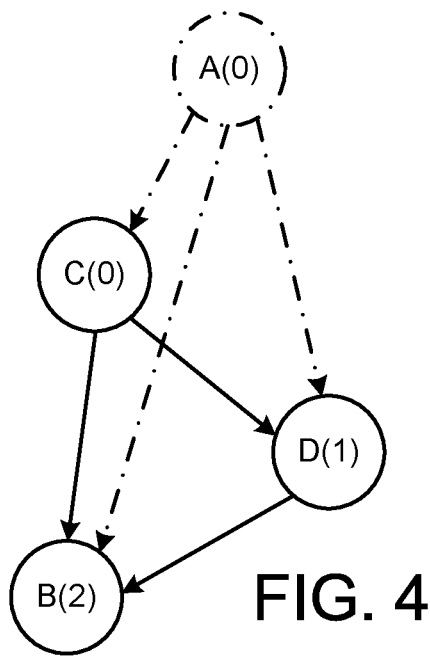
FIG. 4 is an example dependency graph related to FIG. 3, consistent with disclosed implementations.
Figure 5:
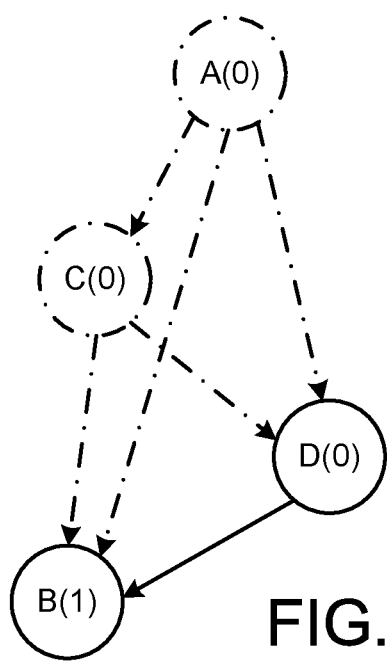
FIG. 5 is an example dependency graph related to FIGS. 3 and 4, consistent with disclosed implementations.

In FIG. 3, the numbers in parenthesis represent the number of incoming/required dependencies an artifact has. In other words, artifact B has three dependencies (on A, C, and D), while artifact A has none. This number may be referred to as a backward edge count. The system may track, via the dependency graph, the backward edge count for each node in the graph. The system may update the backward edge count as artifacts are deployed. For example, after a root node is deployed, it is no longer relevant to the graph, so the system reduces the backward edge count of any successor nodes of the deployed root node. FIG. 4 illustrates the graph of FIG. 3 after deployment of artifact A. In the example of FIG. 4, artifact A and the outgoing edges of artifact A are disregarded or removed from the graph, as indicated by dashed lines. The system reduces the backward edge count for nodes B, C, and D. The system may continue to deploy any nodes with a zero backward edge count. For example, as illustrated by FIG. 4, node C now is a root node and may be deployed. The deployment and subsequent reduction of backward edge counts results in the graph illustrated in FIG. 5. Deployment is complete once all artifacts represented by the nodes in the dependency graph have been deployed. In the example illustrated by FIGS. 3-5 the deployment order automatically determined by the system is A, C, D, B.

The artifact deployment described above can be done sequentially, exactly in the deployment order calculated from the graph. So, using the example of FIGS. 3-5, the system deploys artifact A, then C, then D, then B sequentially. However, if a container, and thus the dependency graph, includes hundreds or even thousands of artefacts, such a deployment would take an unrealistic amount of time. Thus, disclosed implementations of a deployment infrastructure may run artifact deployment in parallel, which improves the speed at which the system can deploy the artifacts.

Figure 6:
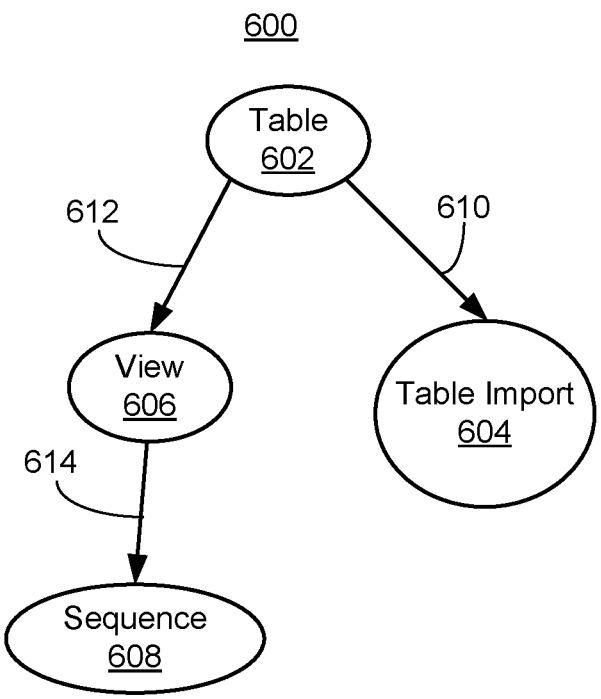
FIG. 6 is an example dependency graph, consistent with disclosed implementations.

A technical problem arises during the deployment of artifacts to database objects in the database when equally ranked nodes in a dependency graph do not have a defined order for deployment. For example, referring to the dependency graph 600 of FIG. 6, the following artifacts should be deployed in the database: a table 602, a data import for the table (table import) 604, a view on the table 606, and a sequence 608 on the view. The dependency graph 600 includes available edges representing the dependencies including available edges 610, 612 and 614. Taking into account these dependencies, the corresponding dependency graph 600 in FIG. 6 is correct.

However, the dependency graph 600 does not convey all of the details to correctly order the artifacts for deployment. For example, the "CREATE SEQUENCE . . . " SQL statement for the creation of the sequence 608 contains a "RESET BY" clause, which specifies a subquery that is executed upon sequence 608 creation to determine the initial value of the sequence 608. This subquery accesses the view 606 and hence reads data from the table 602. As a consequence, the creation of the sequence 608 requires all relevant data in the table 602, which may be inserted, modified and/or deleted by the deployment, in the table 602. In order to have all relevant data in the table 602, the table import 604 needs to be executed before the creation of the sequence 608. According to the graph 600 in FIG. 6, a technical problem arises because the graph 600 does not define the execution order clearly enough, because the view node 606 and the table import node 604 are equally ranked. The ordering algorithm defined above in FIGS. 3-5 might decide to deploy the artifacts in this order: table 602, view 606, sequence 608, table import 604, which would not be the correct deployment order.

Figure 7:
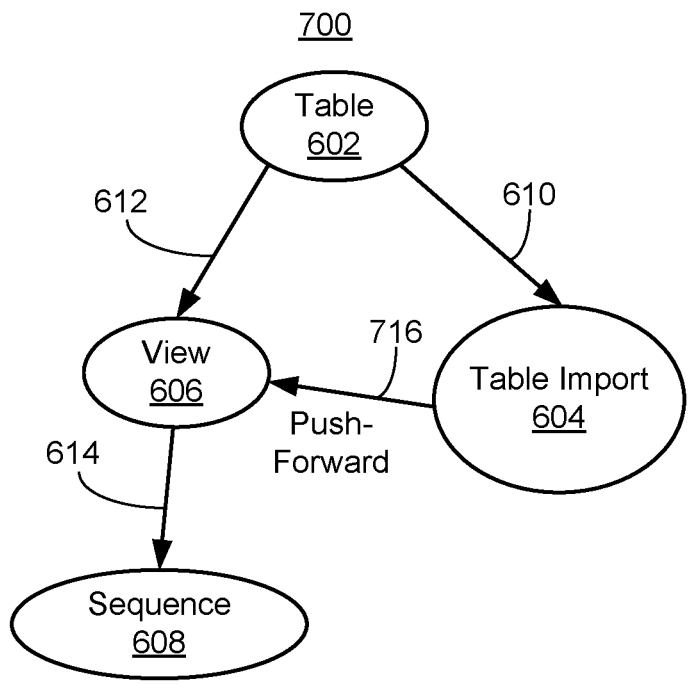
FIG. 7 is an example updated dependency graph of FIG. 6 illustrating a push-forward edge, consistent with disclosed implementations.

A technical solution to this technical problem is to add an additional edge 716 from the table import node to the view node, as illustrated in the updated dependency graph 700 of FIG. 7. The additional edge 716 between the table import node 604 and the view node 606 may be referred to as a push-forward edge 716, e.g., an edge added based on the artifact types of table import 604 and view 606 rather than on anything specified or identified by the artifacts themselves. The artifact conversion engine 124 of FIG. 1 (e.g., a table import plug-in) may know that its artifacts should be deployed before any view artifacts for the same table. Thus, during the build graph phase the table import plug-in may set a flag to cause the addition of the push-forward edge 716 between the table import node 604 and the view node 606 when building the deployment graph. As deployment can include thousands of such artifacts, the deployment order can be complex and too difficult to do manually in an acceptable timeframe.

Now, as shown in FIG. 7, the view node 606 has more incoming edges (i.e., available edge 612 and additional edge 716) than the table import node 604, which only has the available edge 610. Therefore, in the deployment order using the backwards edge count described above with FIGS. 3-5, the view node 606 and hence the sequence node 608 will be handled after the table import node 604, which solves the problem. In an alternate implementation, it is also possible to draw this new edge 716 from the table import node 604 to the sequence node 608 to accomplish the same correct order for deployment.

As mentioned above, the additional edge 716 is called a "push-forward" edge, because, more generally speaking, the table import node 604 is pushed forward towards (or closer to) the table 602. In a certain way, the table import node 604 jumps the queue (cuts in line) with respect to the sequence node 608. The table import node 604 is then the first node to be deployed after the table 602, and before all the other child nodes of the table node 602 in the updated dependency graph 700.

Figure 8:
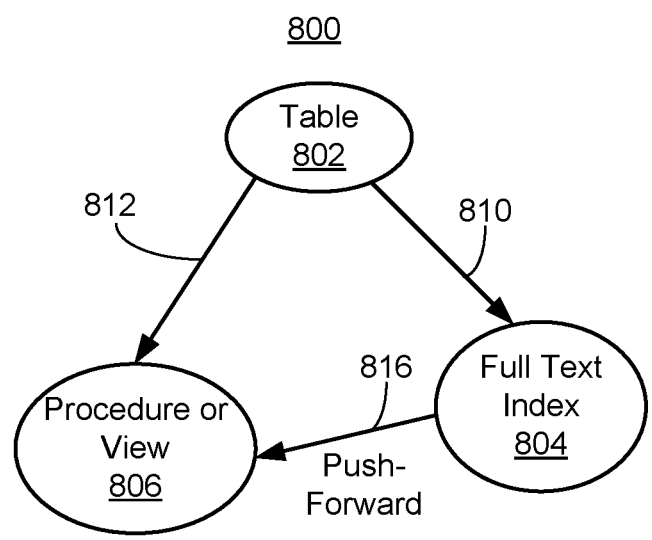
FIG. 8 is an example dependency graph illustrating a push-forward edge, consistent with disclosed implementations.

Another example of a technical problem encountered in the deployment of artifacts to a database is illustrated in the dependency graph 800 of FIG. 8. Here, a table 802 should be deployed having a full-text index 804 and a procedure or view 806 using this full-text index 804. For example, in the procedure 806 a text search is executed on the table 802 using a statement with a CONTAINS clause (T is the Table 802):

select*from T where contains (columnel, 'dog or cat')

Alternatively, it is possible to have a view 806 which is created with an "as select*from T where contains . . . " clause (where T is the table). In this alternative example, too, the view 806 requires not only the table 802 but also the full-text index 804. In other words, here again is an example in which one node, the full-text index 804, must be forced to be deployed prior to another equally ranked node, the procedure or view node 806. By only using the available edges 810 and 812, and without adding an additional edge and using the backwards edge count, the order of the deployment may not achieve the correct order. As above, the technical solution in this case is also an additional "push-forward" edge 816, this time from the full-text index node 804 to the procedure or view node 806. In this manner, when the backwards edge count deployment process is followed, the full-text index 804 is deployed prior to the procedure or view node 806 because the full-text index 804 has few edges (i.e., only available edge 810) than the procedure or view node 806, which include the available edge 812 and the additional edge 816.

The examples in FIGS. 6-8 illustrate, that in certain cases it is necessary that the artifact corresponding to one particular node is deployed before the artifacts corresponding to other, equally ranked nodes.

Figure 9:
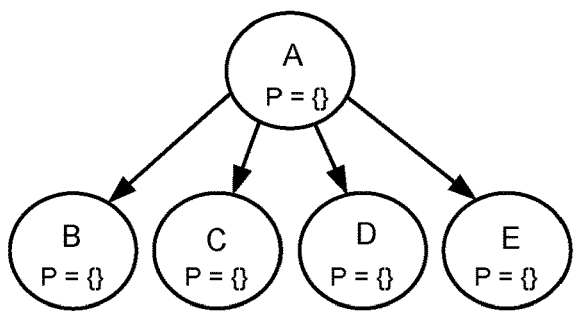
FIG. 9 is an example dependency graph, consistent with disclosed implementations.

FIG. 9 illustrates a generalized situation of a dependency graph with nodes A, B, C, D, and E, where A is deployed first and for the equally ranked nodes, B, C, D, and E, chance decides the deployment order, which is not defined from the point of the view of the dependency graph depicted in FIG. 9.

A technical problem arises when one of the equally ranked nodes needs to be deployed in a particular order with respect to other nodes. In order to enforce a particular deployment order, the following technical solution may be used. For example, in order to enforce a deployment of node C before the deployment of nodes B, D and E, the following technique may be used to introduce additional "push-forward" edges in the graph.

As depicted in FIG. 9, each node, which represents one or more artifacts, has a data structure P, which is initially empty. The data structure P is used to collect the predecessor node information, relative to which the prioritized deployment mechanism of FIG. 1 should introduce new graph edges, in addition to the already available edges illustrated in FIG. 9.

The data structure P may be any type of data structure including, for example, a set, a vector, an array, or any other data structure, which is able to collect several items in an ordered or unordered manner. The predecessor information stored in P is something that uniquely identifies a node in the dependency graph. The predecessor information may include, for example, a string (e.g., containing a node name or artifact name or other name), a pointer, a reference, or any other information that may be suitable in a given implementation.

One or more criterion may be used to determine that a particular node should be deployed prior to other equally ranked nodes. The criterion may include a type of artifact represented by the node or any other criterion. In this example, certain criterion may be used to determine that node C should be deployed as the first node right after the deployment of node A. Therefore, the dependency engine 132 of FIG. 1 collects predecessor node information. The dependency engine 132 populates the data structure in the nodes with the predecessor node information.

Figure 10:
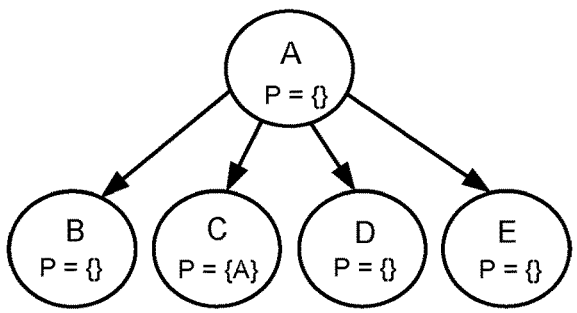
FIG. 10 is an example dependency graph illustrating a populated data structure in the dependency graph of FIG. 9, consistent with disclosed implementations.

In this example, FIG. 10, illustrates that an entry is made in the data structure of node C with the predecessor node information that uniquely identifies node A as a predecessor node. In all the other equally ranked nodes, B, D and E, the data structure P remains empty.

Figure 11:
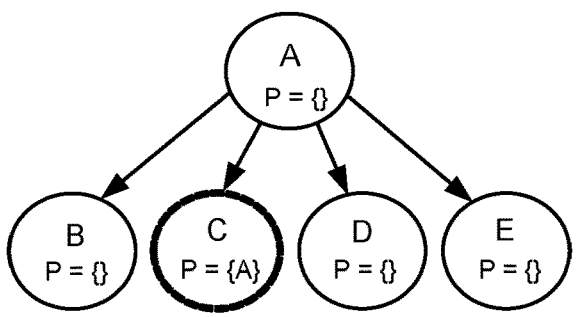
FIG. 11 is an example dependency graph illustrating determination of successor nodes in the dependency graphs of FIGS. 9 and 10, consistent with disclosed implementations.

After the data structures for the nodes are populated, including leaving one or more data structures empty, the dependency engine 132 determines the successor node information using the predecessor node information. For example, the successor nodes of node A are determined by excluding any node having a data structure that refers to node A. As shown in FIG. 11, node C is excluded (as shown in dashed lines) and the other nodes are determined to be successor nodes to node A.

Figure 12:
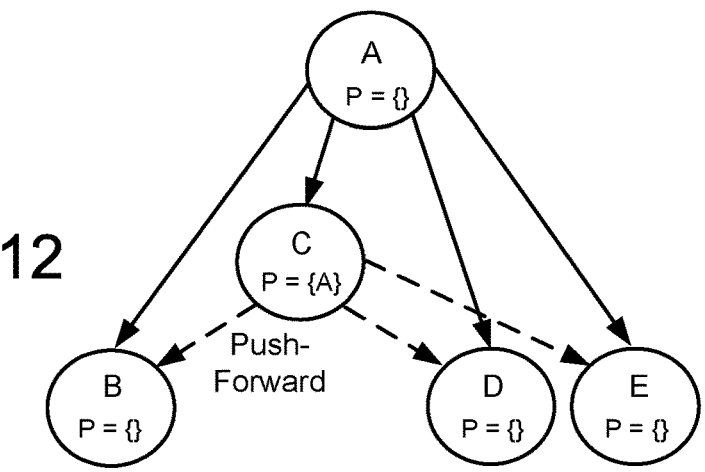
FIG. 12 is an example updated dependency graph of FIGS. 9-11 illustrating push-forward edges, consistent with disclosed implementations.

Then, the artifact conversion engine 124 of FIG. 1, adds additional edges to the dependency graph using the predecessor node information and the successor node information gathered above. As shown in this example in FIG. 12, an additional edge is generated and drawn from node C, a current node populated with predecessor node information, to all other successor nodes of node A. The artifact conversion engine 124 updates the dependency graph as shown in FIG. 12, by adding the additional edges from node C to nodes B, D and E. The trigger for drawing the push-forward edges is the entry "A" in the data structure P of node C. This means that node C is pushed as close as possible towards node A, in order to be ordered for deployment ahead of the other equally ranked nodes B, D and E. The deployment engine 134 then deploys the ordered artifacts to the database 140.

While the example of FIGS. 9-12 illustrate one predecessor node and a few successor nodes, a database deployment may involve hundreds and thousands of artifacts that need to be deployed in the correct order and that may have many situations where artifacts are initially equally ranked, yet need to be deployed in a certain order for a successful and error-free deployment and/or successful runtime execution. The systems and techniques described in this document automate the deployment process using the push-forward edges, including the use of predecessor nodes, data structures, successor nodes, etc. to correctly order and deploy artifacts to a database without human intervention or any sort of manual ordering or processing. Manual processing to order the deployment of artifacts to a database would be impossible due to the size and scale of the database and number of artifacts to deploy.

Figure 2:
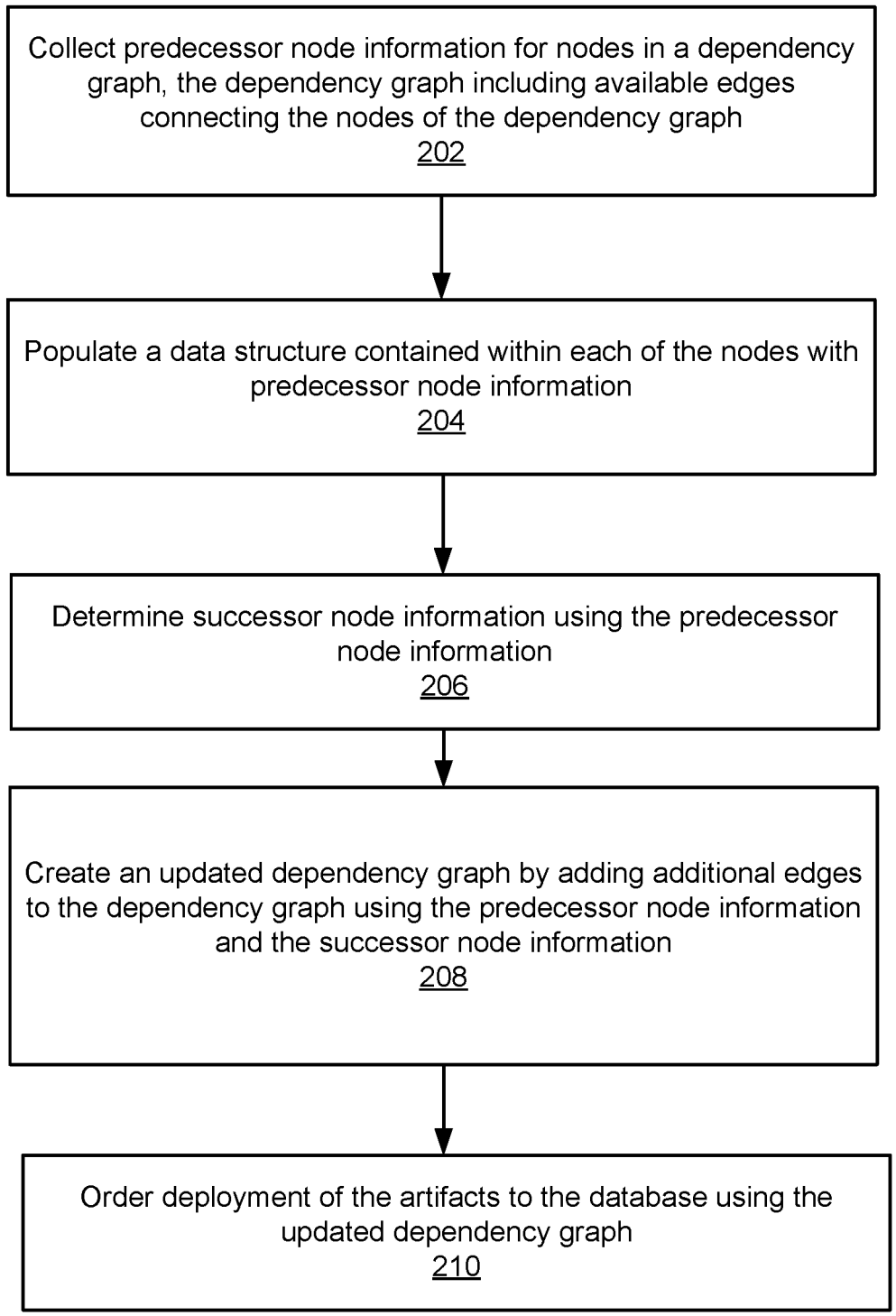
FIG. 2 illustrates a flowchart of an example process for prioritized deployment of database artifacts, consistent with disclosed implementations.

FIG. 2 illustrates a flowchart of an example process 200 for prioritized deployment of database artifacts, consistent with disclosed implementations. The process 200 may be performed by a deployment infrastructure system, such as system 100 of FIG. 1. In prioritized deployment, the system deploys the design-time artifacts to database objects in a correct order to eliminate and/or reduce errors associated with the deployment of the artifacts to the database.

Process 200 includes collecting predecessor node information for nodes in a dependency graph, where the dependency graph includes available edges connecting the nodes of the dependency graph (202). For example, as discussed above with respect to FIGS. 1 and 9-12, the dependency engine 132, which is part of the deployment controller 130, is capable of collecting predecessor node information for nodes in a dependency graph (202). The predecessor node information may be based on pre-determined criterion, such as the criterion discussed above. For example, the pre-determined criterion may include a type of artifact represented by the node. The dependency graph of FIG. 9 illustrates the available edges connecting node A to each of nodes B, C, D and E.

Process 200 includes populating a data structure contained within each of the nodes with the predecessor node information (204). For example, the dependency engine 132 is capable of populating the data structure P, as shown in FIGS. 9-12, with the predecessor node information (204). The data structure populated with the predecessor node information uniquely identifies a predecessor node in the dependency graph. FIG. 10 illustrates that the data structure of node C is populated with the predecessor node information that uniquely identifies node A as a predecessor node. A data structure within a node is empty if there is no predecessor node information related to the node. As described above, the data structures within nodes B, D and E of FIGS. 9-12 are empty because there was no predecessor node information related to those nodes, whereas the data structure within node C is populated because there is predecessor node information related to node C.

Process 200 includes determining successor node information using the predecessor node information (206). For example, the dependency engine 132 determines successor node information using the predecessor node information (206). For example, the successor nodes of root node A are determined by excluding any node having a data structure that refers to node A. As shown in FIG. 11, node C is excluded (as shown in dashed lines) and the other nodes, B, D and E, are determined to be successor nodes to node A.

Process 200 includes creating an updated dependency graph by adding additional edges to the dependency graph using the predecessor node information in the data structure and the successor node information (208). For example, the artifact conversion engine 124 of FIG. 1 is capable of creating the updated dependency graph by adding additional edges (i.e., push-forward edges) to the dependency graph using the predecessor node information and the successor node information. As illustrated in FIG. 12, the artifact conversion engine 124 updated the dependency graph by adding the push-forward edges from node C, a current node populated with the predecessor node information, to the successor nodes B, D, and E of predecessor node A. This essentially pushes node C towards node A and prioritizes node C over nodes B, D, and E. In this manner, the predecessor node information and the additional edges are used to prioritize deployment of one node over other equally ranked nodes.

Process 200 includes ordering deployment of the artifacts to the database using the updated dependency graph (210). For example, the deployment engine 134 of FIG. 1 is capable of ordering the deployment of the artifacts to the database using the updated dependency graph (210). With respect to FIG. 12, the deployment engine 134 would deploy node A, followed by node C and then followed by nodes B, D, and E. A backwards edge count may be used to order the deployment of the artifacts, where the backwards edge count uses the available edges and the additional edges (i.e., push-forward edges) in the updated dependency graph.

Figure 13:
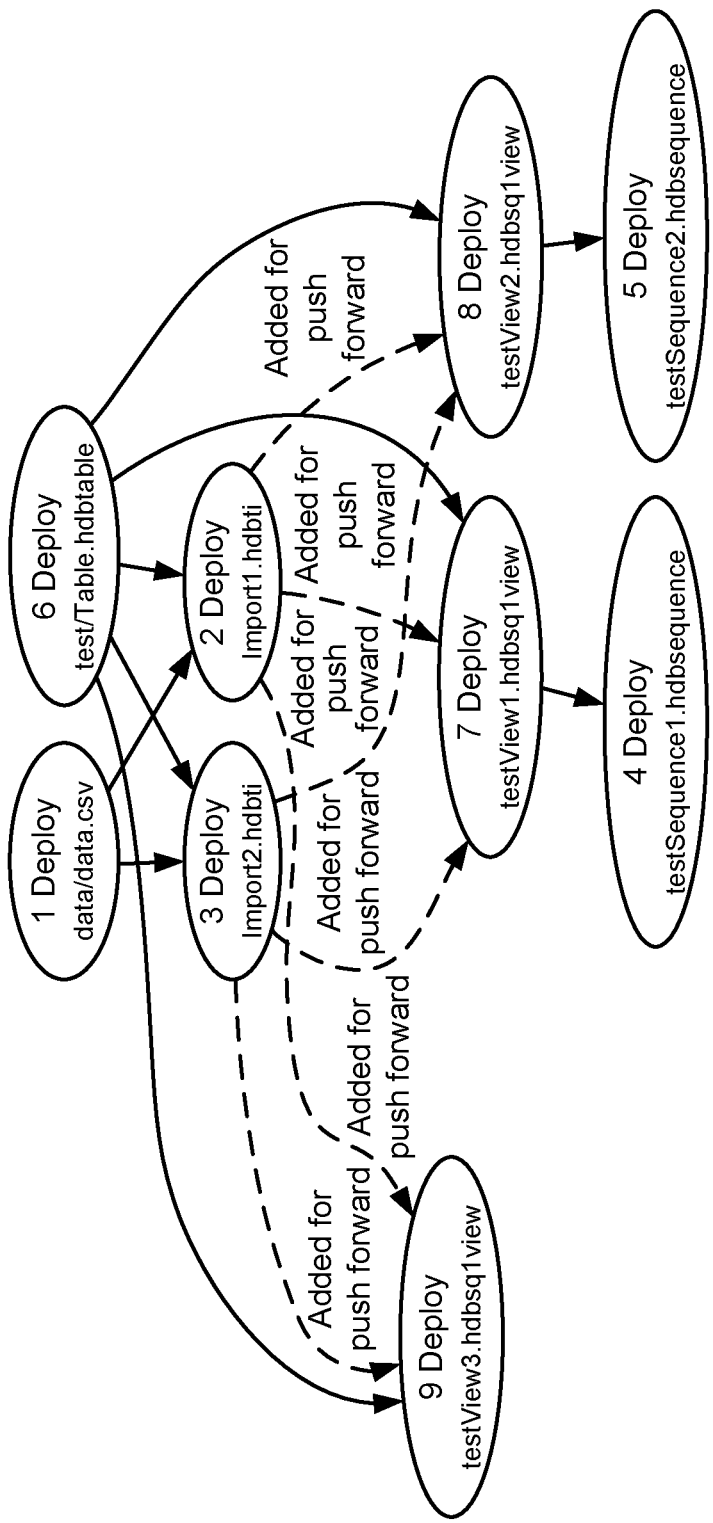
FIG. 13 is an example dependency graph, consistent with disclosed implementations.

As an example, in FIG. 13, a more complex scenario is shown. Here, a table "test/Table.hdbtable" (node 6) has 2 table imports (nodes 2 and 3). On top of that table, 3 views are deployed (nodes 7, 8, 9), and finally on each of the views of node 7 and 8 a sequence is deployed (nodes 4 and 5). Available edges are illustrated in solid lines.

Following the process 200, the predecessor node information is collected (202). Here, criterion identifies predecessor node information, where the criterion may be a type of artifact. A data structure contained within each of the nodes is populated with the predecessor node information (204). In this example, FIG. 13, the 2 table import nodes are identified as having predecessor node information related to node 6. The 2 table import nodes (2, 3) each contain an entry P={test/Table.hdbtable} (not shown in FIG. 13). After populating the nodes 2 and 3 with the predecessor node information, then the successor node information is determined (206) and an updated dependency graph is created by adding additional edges to the dependency graph using the predecessor node information and the successor node information (208). Therefore, from each of the 2 table import nodes push-forward edges (shown in dashed lines in FIG. 13) are drawn to each of the other children of the table node—so from node 2 to nodes 7, 8, 9 and from node 3 to nodes 7, 8, 9. The artifacts are then ordered for deployment to the database using the updated dependency graph (210). As a consequence, after deployment of nodes 1 and 6 first nodes 2, 3 are deployed (order not important) and afterwards nodes 7, 8, 9 (order not important) are deployed. The last nodes to be deployed are nodes 4 and 5, where again the order is not important.

Cycle Detection During Prioritized Deployment

Figure 14:
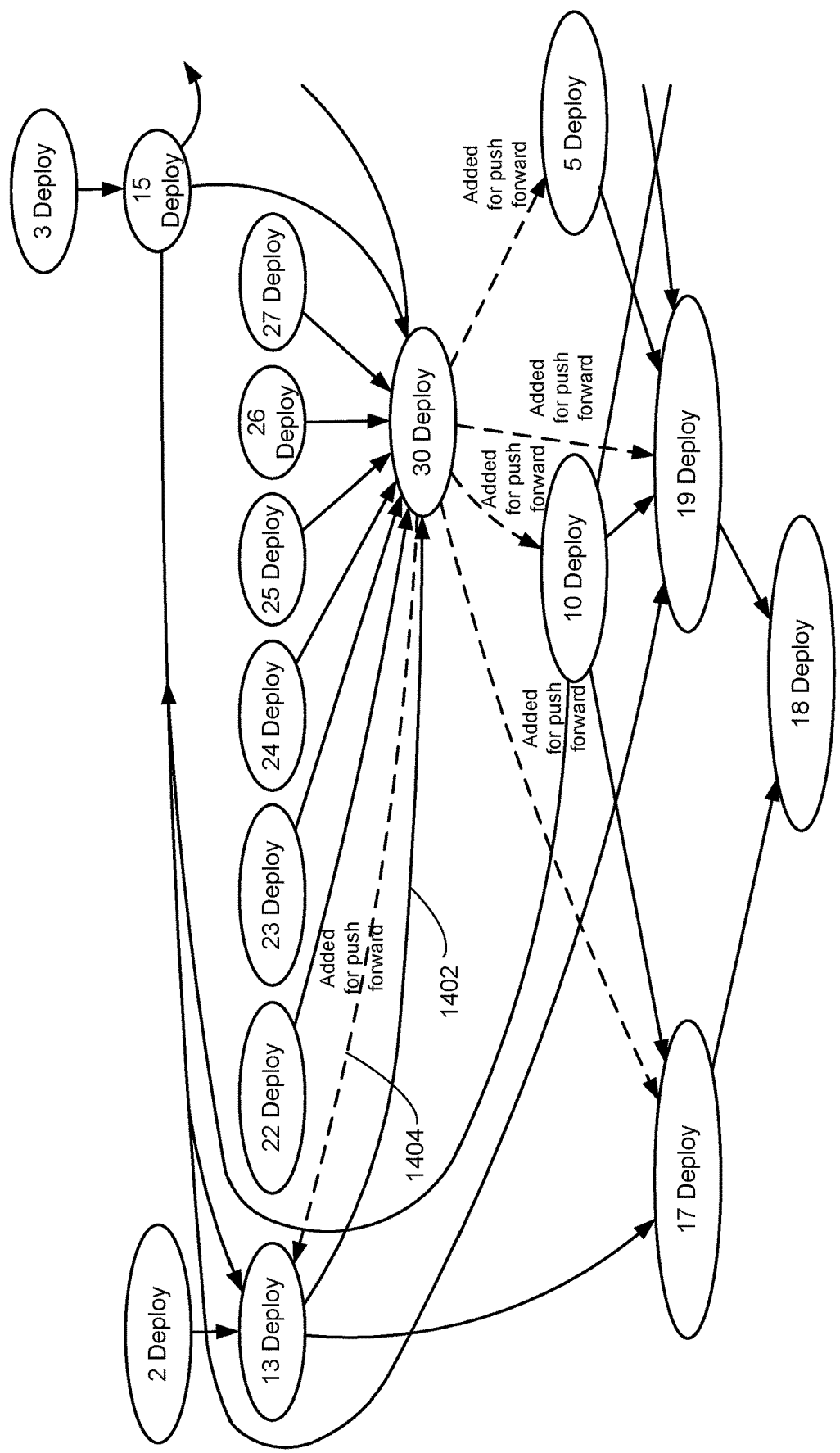
FIG. 14 is an example dependency graph illustrating cycle detection, consistent with disclosed implementations.

FIG. 14 shows a cut-out of a larger picture of a HDI graph. Such graphs, their role in HDI, the meaning of nodes and edges as well as the "push-forward" edges have been explained in detail above. To summarize, the "push-forward" edges give one node priority over other, equally ranked nodes. The "push-forward" edges are drawn from that prioritized node to all the child nodes of a superordinate table node.

In the sample graph of FIG. 14, the "push-forward" edges (dashed lines arrows) are drawn from node 30 to many other nodes, which are all child nodes of node 15. Node 15 is a table node, and it is superordinate to node 30. However, here a problem arises: There is already an edge 1402 from node 13 to node 30, which means that the artifact represented by node 13 provides something which is required by the artifact represented by node 30. This means that in any case node 13 must be deployed before node 30. So it makes no sense in this particular situation to add a "push-forward" edge 1404 which would try the contrary, i.e., first deploy node 30 and then node 13.

The "push-forward" edge 1404 from node 30 back to node 13 would introduce a cycle: There is an edge 1402 from node 13 to node 30 and in addition an edge 1404 from node 30 to node 13. The two nodes are highlighted to visually alert this cycle situation. Such a graph cannot be processed, because there is an ambiguous situation. It is not clear, which one of the two nodes should be deployed first.

The solution to this technical problem is to detect and avoid such cycles. Since the solid arrows are drawn before the "push-forward" arrows dashed), this is not too difficult.

The algorithm, which figures out the nodes between which to draw the "push-forward" edges, must be extended. The graph has internal data structures which store all existing edges in a suitable way (dependent on the specific implementation). So the graph knows that there is an edge from a starting node A to a target node B. The graph might store this information, for example, as a tuple (A, B), or in any other suitable way. Now, when the "push-forward" edges are drawn, it is simply checked if an inverse edge (e.g., edge 1402) already exists. For example, if a "push-forward" edge should be drawn from node B to node A, the algorithm checks if the graph already knows tuple (A, B) for the inverse edge. If this is the case, the new "push-forward" edge is not drawn, in order to avoid a cycle.

Figure 15:
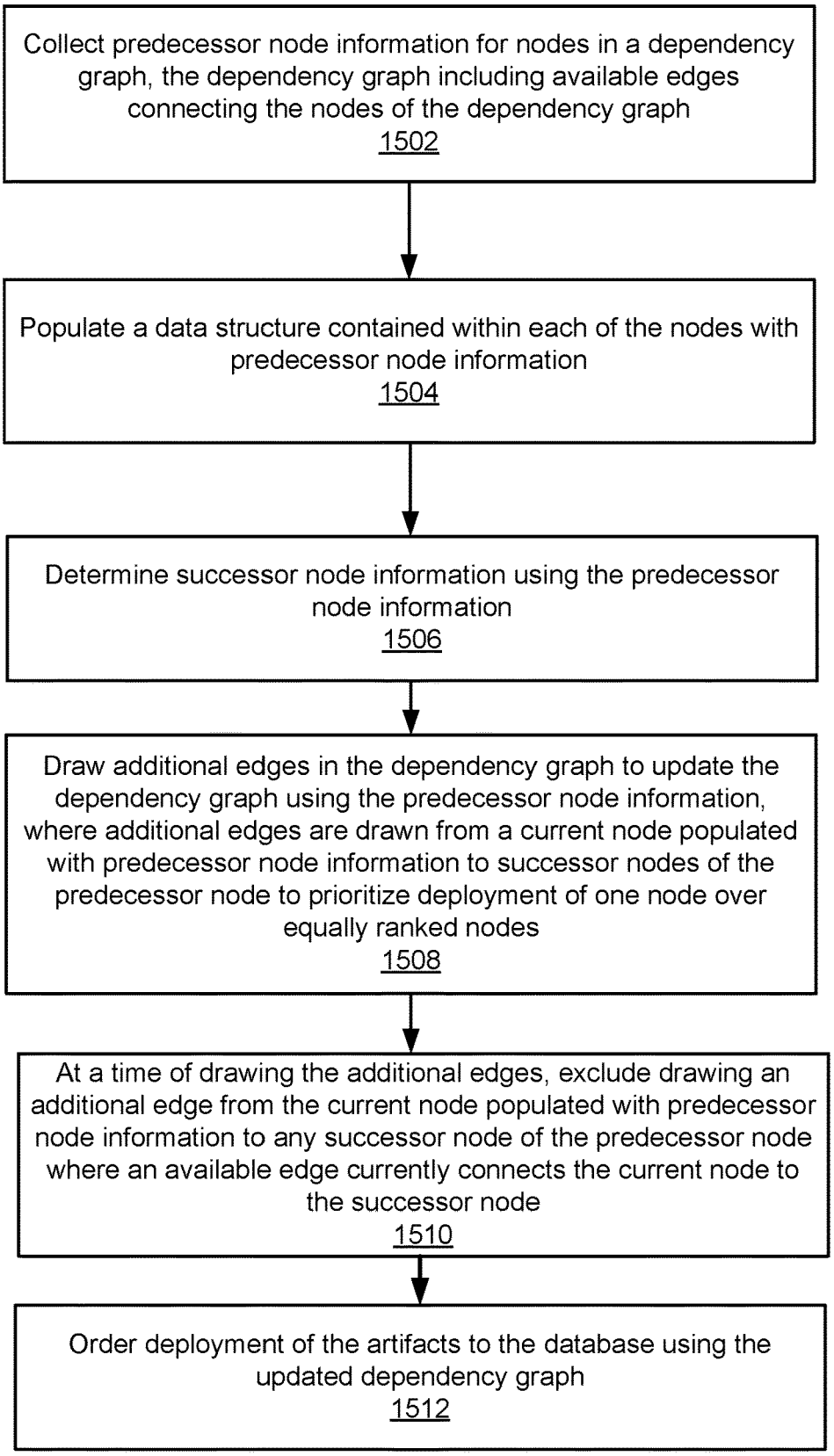
FIG. 15 illustrates a flowchart of an example process for prioritized deployment of database artifacts with cycle detection, consistent with disclosed implementations.

Referring to FIG. 15, an example process 1500 illustrates ordering the deployment of artifacts to a database, including handling a cycle detection issue. Process 1500 includes collecting predecessor node information for nodes in dependency graph (1502). For example, the dependency engine 132, which is part of the deployment controller 130, is capable of collecting predecessor node information for nodes in a dependency graph (1502). The predecessor node information may be based on pre-determined criterion, such as the criterion discussed above. For example, the pre-determined criterion may include a type of artifact represented by the node.

Process 1500 includes populating a data structure contained within each of the nodes with the predecessor node information (1504). For example, the dependency engine 132 is capable of populating the data structure, with the predecessor node information (1504). Process 1500 includes determining successor node information using the predecessor node information (1506). For example, the dependency engine 132 determines successor node information using the predecessor node information (1506).

Process 1500 includes drawing additional edges in the dependency graph to update the dependency graph using the predecessor node information, where the additional edges are drawn from a current node populated with predecessor node information to successor nodes of the predecessor node to prioritize deployment of one node over equally ranked nodes (1508). For example, the artifact conversion engine 124 is capable of drawing additional edges in the dependency graph to update the dependency graph using the predecessor node information, where the additional edges are drawn from a current node populated with predecessor node information to successor nodes of the predecessor node to prioritize deployment of one node over equally ranked nodes.

Process 1500 includes, at a time of drawing the additional edges, excluding drawing an additional edge from the current node populated with predecessor node information to any successor node of the predecessor node where an available edge currently connects the current node to the successor node (1510). For example, the artifact conversion engine 124 is capable of excluding drawing an additional edge from the current node populated with predecessor node information to any successor node of the predecessor node where an available edge currently connects the current node to the successor node. In this manner, technical problems arising from cycle detection are solved by the artifact conversion engine's 124 exclusion of drawing the additional edges between the nodes when available edges already exist between the nodes.

Finally, process 1500 includes ordering deployment of the artifacts to the database using the updated dependency graph (1512). For example, the deployment engine 134 of FIG. 1 is capable of ordering the deployment of the artifacts to the database using the updated dependency graph (1512).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for ordering deployment of artifacts to a database, the method comprising:
    identifying a dependency graph, wherein the dependency graph comprises available edges connecting nodes of the dependency graph, wherein each node in the dependency graph represents at least one artifact, wherein each edge connecting the nodes represents a dependency between nodes;
    collecting predecessor node information for nodes that meet a predetermined criterion in the dependency graph;
    populating, in each particular node that meets the predetermined criterion, a data structure that is stored within each of the nodes of the dependency graph, wherein the data structure is populated with data identifying a predecessor node corresponding to the particular node;
    determining successor node information using the predecessor node information, wherein a successor node is a node that is dependent on the predecessor node and does not contain the data identifying the predecessor node;
    creating an updated dependency graph by adding additional edges to the dependency graph using the predecessor node information in the data structure within each of the particular nodes and the determined successor node information, wherein the additional edges are drawn from each particular node populated with the predecessor node information to successor nodes of the particular node's predecessor node; and
    ordering deployment of the artifacts to the database using the updated dependency graph.

2. The method as in claim 1, further comprising deploying the ordered artifacts to the database.

3. The method as in claim 1, wherein the data structure populated with the predecessor node information uniquely identifies the predecessor node in the dependency graph.

4. The method as in claim 1, wherein the predetermined criterion includes a type of artifact represented by a node.

5. The method as in claim 1, wherein the data structure within a node is empty if there is no predecessor node information related to the node.

6. The method as in claim 1, wherein ordering deployment of the artifacts comprises using a backward edge count including the available edges and the additional edges in the updated dependency graph to order deployment of the artifacts.

7. The method as in claim 1, wherein the predecessor node information and the additional edges are used to prioritize deployment of one node over other equally ranked nodes.

8. The method as in claim 1, further comprising:
prior to creating the updated dependency graph, determining whether any of the additional edges will duplicate any of the available edges; and
not adding any additional edge to the dependency graph if the additional edge duplicates any of the available edges.

9. A computer program product for ordering deployment of artifacts to a database, the computer program product being tangibly embodied on a non-transitory computer-readable storage medium and comprising instructions that, when executed, are configured to cause at least one computing device to:
identify a dependency graph, wherein the dependency graph comprises available edges connecting nodes of the dependency graph, wherein each node in the dependency graph represents at least one artifact, wherein each edge connecting the nodes represents a dependency between nodes;
collect predecessor node information for nodes that meet a predetermined criterion in the dependency graph;
populate, in each particular node that meets the predetermined criterion, a data structure that is stored within each of the nodes of the dependency graph, wherein the data structure is populated with data identifying a predecessor node corresponding to the particular node;
determine successor node information using the predecessor node information, wherein a successor node is a node that is dependent on the predecessor node and does not contain the data identifying the predecessor node;
prioritize deployment of one node over equally ranked nodes by drawing additional edges in the dependency graph to update the dependency graph using the predecessor node information, wherein the additional edges are drawn from a current node populated with the predecessor node information to successor nodes of the predecessor node;
at a time of drawing the additional edges, exclude drawing an additional edge from the current node populated with predecessor node information to any successor node of the predecessor node where an available edge currently connects the current node to the successor node; and
order deployment of the artifacts to the database using the updated dependency graph.

10. The computer program product of claim 9, further comprising instructions that, when executed, are configured to cause at least one computing device to deploy the ordered artifacts to the database.

11. The computer program product of claim 9, wherein the data structure populated with the predecessor node information uniquely identifies the predecessor node in the dependency graph.

12. The computer program product of claim 9, wherein the instructions that, when executed, are configured to cause at least one computing device to order deployment of the artifacts comprises instructions that, when executed, are configured to cause the at least one computing device to use a backward edge count including the available edges and the additional edges in the updated dependency graph to order deployment of the artifacts.

13. A system for ordering deployment of artifacts to a database, the system comprising:
at least one memory including instructions on a computing device; and
at least one processor on the computing device, wherein the processor is operably coupled to the at least one memory and is arranged and configured to execute the instructions that, when executed, cause the processor to implement:
a dependency engine capable of:
identifying a dependency graph, wherein the dependency graph comprises available edges connecting nodes of the dependency graph, wherein each node in the dependency graph represents at least one artifact, wherein each edge connecting the nodes represents a dependency between nodes;
collecting predecessor node information for nodes that meet a predetermined criterion in the dependency graph,
populating a data structure that is stored within each of the nodes of the dependency graph, wherein the data structure stored within a particular node contains data identifying a predecessor node corresponding to the particular node, and
determining successor node information using the predecessor node information, wherein a successor node is a node that is dependent on the predecessor node and does not contain the data identifying the predecessor node;
an artifact conversion engine capable of creating an updated dependency graph by adding additional edges to the dependency graph using the predecessor node information in the data structure within each of the particular nodes and the determined successor node information, wherein the additional edges are drawn from each particular node populated with the predecessor node information to successor nodes of the particular node's predecessor node; and
a deployment engine capable of ordering deployment of the artifacts to the database using the updated dependency graph.

14. The system of claim 13, wherein the deployment engine is capable of deploying the ordered artifacts to the database.

15. The system of claim 13, wherein the data structure populated with the predecessor node information uniquely identifies the predecessor node in the dependency graph.

16. The system claim 13, wherein the deployment engine is capable of ordering deployment of the artifacts using a backward edge count including the available edges and the additional edges in the updated dependency graph to order deployment of the artifacts.

17. The system of claim 13, wherein the predecessor node information and the additional edges are used to prioritize deployment of one node over other equally ranked nodes.

18. The system of claim 13, wherein the artifact conversion engine is further capable of:
prior to creating the updated dependency graph, determining whether any of the additional edges will duplicate any of the available edges; and not adding any additional edge to the dependency graph if the additional edge duplicates any of the available edges.

* * * * *